United States Patent
Lee et al.

(10) Patent No.: US 12,206,096 B2
(45) Date of Patent: Jan. 21, 2025

(54) ANODE ACTIVE MATERIAL FOR SECONDARY BATTERY, SECONDARY BATTERY INCLUDING THE SAME, AND METHOD OF PREPARING THE SAME

(71) Applicant: SK On Co., Ltd., Seoul (KR)

(72) Inventors: Mi Ryeong Lee, Daejeon (KR); Hee Gyoung Kang, Daejeon (KR); Jong Hyuk Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 509 days.

(21) Appl. No.: 17/552,576

(22) Filed: Dec. 16, 2021

(65) Prior Publication Data

US 2022/0199972 A1    Jun. 23, 2022

(30) Foreign Application Priority Data

Dec. 17, 2020   (KR) .................. 10-2020-0177112

(51) Int. Cl.
| | |
|---|---|
| *H01M 4/36* | (2006.01) |
| *H01M 4/02* | (2006.01) |
| *H01M 4/38* | (2006.01) |
| *H01M 4/48* | (2010.01) |
| *H01M 4/587* | (2010.01) |
| *H01M 4/62* | (2006.01) |
| *H01M 10/0525* | (2010.01) |

(52) U.S. Cl.
CPC ........... *H01M 4/366* (2013.01); *H01M 4/386* (2013.01); *H01M 4/483* (2013.01); *H01M 4/587* (2013.01); *H01M 4/62* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 11,024,886 B2 | 6/2021 | Park et al. | |
| 2007/0178382 A1 | 8/2007 | Kim et al. | |
| 2012/0009477 A1* | 1/2012 | Chen ............... | H01M 4/625 |
| | | | 429/231.1 |
| 2015/0162604 A1* | 6/2015 | Park ............... | H01M 4/62 |
| | | | 252/182.1 |

FOREIGN PATENT DOCUMENTS

| | | | | |
|---|---|---|---|---|
| JP | 2007191389 A | * | 8/2007 | |
| JP | 2012133981 A | * | 7/2012 | ............. C01B 32/20 |
| JP | 5377875 B2 | | 12/2013 | |
| KR | 100816586 B1 | | 3/2008 | |
| KR | 101680466 B1 | | 11/2016 | |
| KR | 1020170063271 A | | 6/2017 | |
| KR | 1020170099748 A | | 9/2017 | |

OTHER PUBLICATIONS

Machine Translation of JP 2012-133981A (Year: 2012).*
Machine Translation of JP-2007191389-A (Year: 2007).*

* cited by examiner

*Primary Examiner* — Gregg Cantelmo (74) *Attorney, Agent, or Firm* — The Webb Law Firm (57) ABSTRACT

An anode active material for a secondary battery according to an embodiment of the present invention includes first particles serving as a core active material and second particles attached on surfaces of the first particles. A weight of the second particles based on 100 weight parts of a total weight of the first particles and the second particles satisfies a predetermined relation. A secondary battery including the anode active material is provided.

12 Claims, 4 Drawing Sheets

ANODE ACTIVE MATERIAL FOR SECONDARY BATTERY, SECONDARY BATTERY INCLUDING THE SAME, AND METHOD OF PREPARING THE SAME

CROSS-REFERENCE TO RELATED APPLICATION

This application claims priority to Korean Patent Application No. 10-2020-0177112 filed Dec. 17, 2020, the disclosure of which is hereby incorporated by reference in its entirety.

BACKGROUND OF THE INVENTION

1. Field of the Invention

The present invention relates to an anode active material for a secondary battery, a lithium secondary battery including the same and a method of preparing the same. More particularly, the present invention relates to an anode active material for a secondary battery including different types of particles, a secondary battery including the same and a method of preparing the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

Recently, as an application of the lithium secondary battery has been extended from a small electronic device to a large-scaled device such as a hybrid vehicle, sufficient capacity and power may not be achieved from a conventional lithium secondary battery.

For example, an electric vehicle (EV) driven only by a battery may not provide a sufficient driving time due to a rapid and large power consumption.

Therefore, developments of a lithium secondary battery capable of providing high rate and capacity properties is required.

For example, Korean Published Patent Application No. 2017-0099748 discloses an electrode assembly for a lithium secondary battery and a lithium secondary battery including the same.

SUMMARY OF THE INVENTION

According to an aspect of the present invention, there is provided an anode active material for a secondary battery having improved electrical property.

According to an aspect of the present invention, there is provided a secondary battery having improved electrical property.

According to an aspect of the present invention, there is provided a method of preparing an anode active material for a secondary battery having improved electrical property.

According to exemplary embodiments, an anode active material for secondary battery includes first particles serving as a core active material and second particles attached on surfaces of the first particles. A weight of the second particles based on 100 weight parts of a total weight of the first particles and the second particles satisfies Equation 1 below:

$$\frac{400(D+d)^2 d}{D^3} \times \frac{\gamma_d}{\gamma_D} \times 0.5 \leq A \leq \frac{400(D+d)^2 d}{D^3} \times \frac{\gamma_d}{\gamma_D} \times 1.5 \quad \text{[Equation 1]}$$

In Equation 1, A is a weight part of the second particles, D is a particle diameter (μm) of the first particles, $\gamma_D$ is a bulk density (g/mL) of the first particles, d is a particle diameter (μm) of the second particles, and γd is a bulk density (g/mL) of the second particles.

In some embodiments, the weight of the second particle based on 100 weight parts of the total weight of the first particles and the second particles may satisfy Equation 2 below:

$$\frac{400(D+d)^2 d}{D^3} \times \frac{\gamma_d}{\gamma_D} \times 0.75 \leq A \leq \frac{400(D+d)^2 d}{D^3} \times \frac{\gamma_d}{\gamma_D} \times 1.25 \quad \text{[Equation 2]}$$

In some embodiments, a ratio of the particle diameter of the second particles relative to the particle diameter of the first particles may be 0.1 or less.

In some embodiments, a ratio of the particle diameter of the second particles relative to the particle diameter of the first particles may be in a range from 0.001 to 0.1.

In some embodiments, wherein the bulk density of the second particles may be less than or equal to the bulk density of the first particles.

In some embodiments, the bulk density of the second particles may be smaller than the bulk density of the first particles. The bulk density of the first particles may be from 0.5 g/mL to 3 g/mL, and the bulk density of the second particles may be from 0.01 g/mL to 1 g/mL.

In some embodiments, the second particles may form a mono-layered coating on a surface of each of the first particles.

In some embodiments, the first particles may include at least one of a carbon-based active material or a silicon-based active material.

In some embodiments, the second particles may include at least one of a carbon-based material, a silicon-based material, a metal-based material or an oxide-based material.

In some embodiments, the carbon-based material includes carbon nanotube, carbon fiber, carbon black or Super P. These may be used along or in a combination thereof.

In some embodiments, the oxide-based material may include lithium titanate (LTO), $TiO_2$, $ZrO_2$, $ZnO_2$, $AlO_2$, $Fe_2O_3$, $Li_2O$, or $MgO$. These may be used along or in a combination thereof.

In method of preparing an anode active material for a secondary battery according to exemplary embodiments, first particles as a core active material and second particles as a coating particle are prepared. The first particles and the second particles are mixed by a dry rotation to attach the second particles on surfaces of the first particles. A weight of the second particles based on 100 weight parts of a total weight of the first particles and the second particles satisfies Equation 1 below:

$$\frac{400(D+d)^2 d}{D^3} \times \frac{\gamma_d}{\gamma_D} \times 0.5 \le A \le \frac{400(D+d)^2 d}{D^3} \times \frac{\gamma_d}{\gamma_D} \times 1.5 \quad \text{[Equation 1]}$$

In Equation 1, A is a weight part of the second particles, D is a particle diameter (μm) of the first particles, $\gamma_D$ is a bulk density (g/mL) of the first particles, d is a particle diameter (μm) of the second particles, and γd is a bulk density (g/mL) of the second particles.

In some embodiments, the dry rotation may be performed at a linear velocity from 650 cm/s to 2,700 cm/s.

According to exemplary embodiments, a secondary battery includes an anode including the anode active material for a secondary battery according to embodiments as described above, and a cathode facing the anode and being physically separated from the anode.

In an anode active material according to exemplary embodiments of the present invention, second particles serving as coating particles may be attached to a first particle serving as a core particle, and a surface of the first particle may be substantially uniformly coated by the second particles. Thus, both high-capacity property from the first particle and high-rate property from the second particle may be achieved.

For example, the second particles may form a single-layered coating on the first particle to be firmly attached to the first particle by. Accordingly, capacity and efficiency of the secondary battery may be further improved.

DESCRIPTION OF THE INVENTION

According to exemplary embodiments of the present invention, an anode active material for a secondary battery including a first particle and second particles attached on a surface of the first particle is provided. According to exemplary embodiments of the present invention, a lithium secondary battery including the anode active material is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
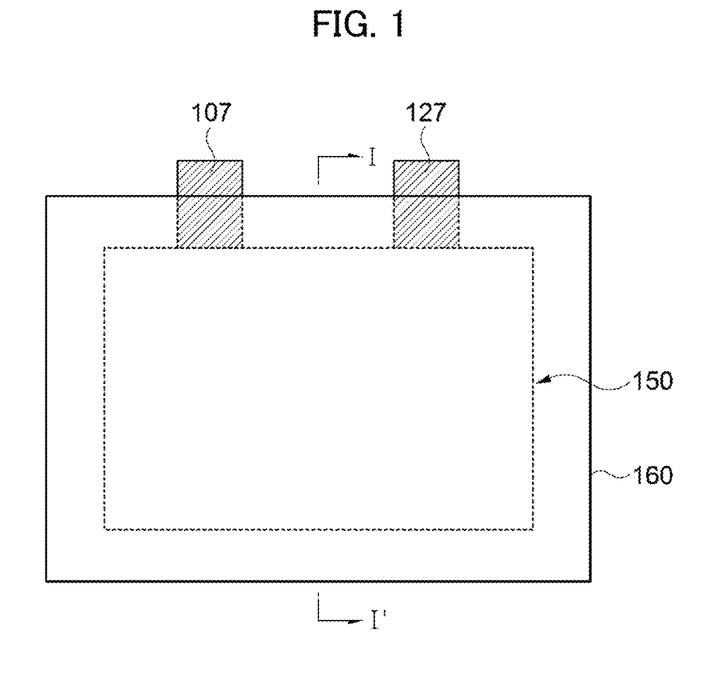
FIGS. 1 and 2 are a schematic top planar view and a schematic cross-sectional view, respectively, illustrating a lithium secondary battery in accordance with exemplary embodiments.
Figure 2:
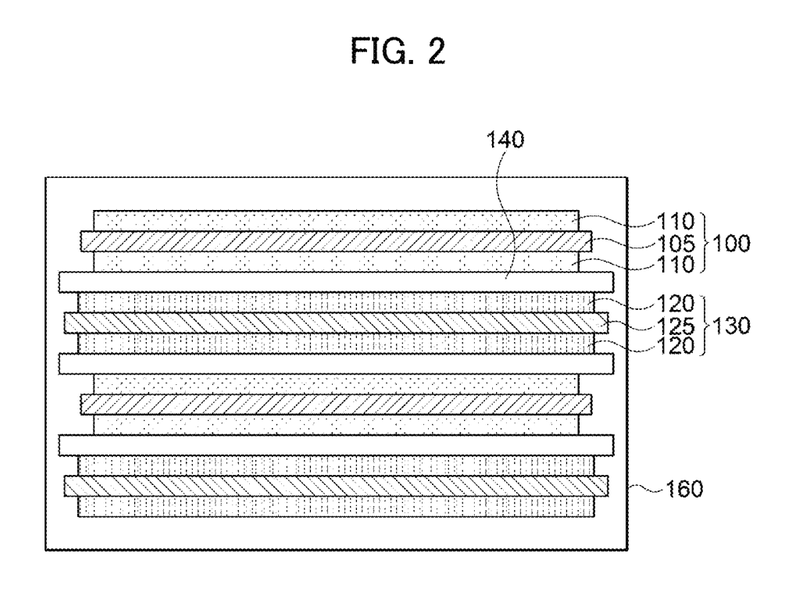

FIGS. 1 and 2 are a schematic top planar view and a schematic cross-sectional view, respectively, illustrating a lithium secondary battery in accordance with exemplary embodiments. For example, FIG. 2 is a cross-sectional view taken along the line I-I' shown in FIG. 1 in a thickness direction of the lithium secondary battery.

For convenience of descriptions, illustration of the cathode and the anode is omitted in FIG. 1.

Referring to FIGS. 1 and 2, the lithium secondary battery may include an electrode assembly 150 and a case 160 accommodating the electrode assembly 150. The electrode assembly 150 may include a cathode 100, an anode 130 and a separation layer 140.

The cathode 100 may include a cathode current collector 105 and a cathode active material layer 110 formed on at least one surface of the cathode current collector 105. In exemplary embodiments, the cathode active material layer 110 may be formed on both surfaces (e.g., upper and lower surfaces) of the cathode current collector 105. For example, the cathode active material layer 110 may be coated on each of the upper and lower surfaces of the cathode current collector 105, and may be directly coated on the surface of the cathode current collector 105.

The cathode current collector 105 may include stainless-steel, nickel, aluminum, titanium, copper or an alloy thereof. Preferably, aluminum or an alloy thereof may be used.

The cathode active material layer 110 includes a lithium metal oxide as a cathode active material. In exemplary embodiments, the cathode active material layer 110 may include a lithium (Li)-nickel (Ni)-based oxide.

In some embodiments, the lithium metal oxide included in the cathode active material layer 110 may be represented by Chemical Formula 1 below.

$$Li_{1+a}Ni_{1-(x+y)}Co_xM_yO_2 \quad \text{[Chemical Formula 1]}$$

In Chemical Formula 1, $-0.05 \le a \le 0.15$, $0.01 \le x \le 0.2$, $0 \le y \le 0.2$, and M may be at least one element selected from the group consisting of Mg, Sr, Ba, B, Al, Si, Mn, Ti Zr, and W. In an embodiment, $0.01 \le x \le 0.20$, $0.01 \le y \le 0.15$.

Preferably, in Chemical Formula 1, M may include manganese (Mn). In this case, nickel-cobalt-manganese (NCM)-based lithium oxide may be used as the cathode active material.

For example, nickel (Ni) may serve as a metal related with capacity of a lithium secondary battery. As a content of nickel increases, capacity and power of the lithium secondary battery may be improved. However, if the content of nickel is excessively increased, life-span and mechanical/electrical stability of the battery may be deteriorated. For example, cobalt (Co) may serve a metal related with conductivity or resistance of the lithium secondary battery. In an embodiment, M may include manganese (Mn), and Mn may serve as a metal related to mechanical and electrical stability of the lithium secondary battery.

Capacity, power, low resistance and life-span stability may be improved together using the interaction of nickel, manganese and cobalt from the cathode active material layer 110.

For example, the cathode active material may be mixed in a solvent with a binder, a conductive material and/or a dispersive agent to form a slurry. The slurry may be coated on the cathode current collector 105, and then dried and pressed to form the cathode active material layer 110.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material or the lithium metal oxide particles may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In some embodiments, an electrode density of the cathode 100 may be from 3.0 g/cc to 3.9 g/cc, preferably 3.2 g/cc to 3.8 g/cc.

In some embodiments, the cathode material layer 110 may have a multi-layered structure.

The anode 130 may include an anode current collector 125 and an anode active material layer 120 formed on at least one surface of the anode current collector 125. In exemplary embodiments, the anode active material layer 120 may be formed on both surfaces (e.g., upper and lower surfaces) of the anode current collector 125. The anode active material layer 120 may be coated on each of the upper and lower surfaces of the anode current collector 125. For example, the anode active material layer 120 may directly contact the surface of the anode current collector 125.

The anode current collector 125 may include gold, stainless steel, nickel, aluminum, titanium, copper or an alloy thereof, preferably may include copper or a copper alloy.

In exemplary embodiments, the anode active material layer 120 may include an anode active material. The anode active material may include a material capable of intercalating/de-intercalating lithium ions.

Figure 3:
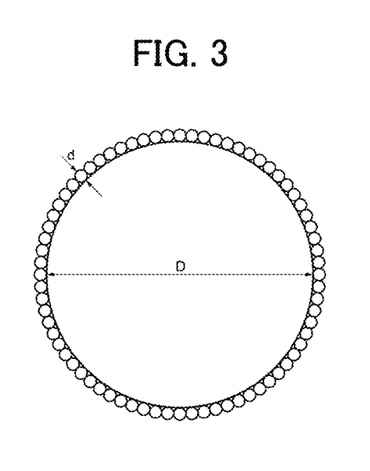
FIG. 3 is a schematic cross-sectional view of an anode active material for a secondary battery in accordance with exemplary embodiments.

The anode active material may include first particles serving as a main active material and second particles distributed around the first particle. The second particles may be attached to a surface of the first particle.

In exemplary embodiments, a plurality of the second particles may be attached to the first particle to be in direct contact with each first particle. In some embodiments, the second particles may form a coating having a substantially mono-layered structure.

In exemplary embodiments, the first particle may include a carbon-based active material or a silicon-based active material.

Examples of the carbon-based active material include graphite, hard carbon, soft carbon, and cokes. Preferably, the carbon-based active material used for the first particle may include natural graphite and/or artificial graphite.

The silicon-based active material may include silicon (Si), SiOx (0<x<2), or a SiOx (0<x<2) containing a lithium compound. The SiOx containing the Li compound may be SiOx containing lithium silicate. Lithium silicate may be present in at least a portion of a SiOx (0<x<2) particle. For example, lithium silicate may be present at an inside and/or on a surface of the SiOx (0<x<2) particle. In an embodiment, lithium silicate may include $Li_2SiO_3$, $Li_2Si_2O_5$, $Li_4SiO_4$, $Li_4Si_3O_8$, or the like.

In some embodiments, the first particle may include a silicon-carbon-based active material. The silicon-carbon-based active material may include, e.g., silicon carbide (SiC) or a silicon-carbon particle having a core-shell structure. The silicon-carbon particle may be formed by, e.g., depositing a silicon layer on a surface of a graphite core. In an embodiment, the silicon-carbon particle may be formed by coating a silicon layer on a commercially available graphite particle by a chemical vapor deposition (CVD) process using a silicon precursor compound such as a silane-based compound.

In some embodiments, the first particle may further include, e.g., an amorphous carbon coating.

The second particle may include a carbon-based material, a silicon-based material, a metal-based material, an oxide-based material, etc.

The carbon-based material may include, e.g., a material different from the carbon-based active material included in the first particle. In some embodiments, the carbon-based material may include a carbon nanotube, a carbon fiber, carbon black, Super P, or the like. These may be used alone or in combination thereof.

The metal-based material may include tin (Sn) or aluminum (Al). The oxide-based material may include lithium titanate (LTO), $TiO_2$, $ZrO_2$, $ZnO_2$, $AlO_2$, $Fe_2O_3$, $Li_2O$, $MgO$, etc. The silicon-based material may include Si, $SiO_2$, SiC, or the like.

In exemplary embodiments, the second particles may form a substantially mono-layered coating on the surface of the first particle. In the present application, "coating" is used to encompass a layer or a pattern at a local area in the form of, e.g., an island, and a layer in the form of a sealing that may cover the entire surface of the first particle.

Accordingly, while achieving high-capacity properties from the first particle, rate properties and mechanical/chemical stability may be improved from the mono-layered coating of the second particle without deteriorating the high-capacity properties from the first particle.

In exemplary embodiments, a weight of the second particle (A) based on 100 weight parts of a total weight of the first particle and the second particle may satisfy Equation 1 below.

$$\frac{400(D+d)^2 d}{D^3} \times \frac{\gamma_d}{\gamma_D} \times 0.5 \leq A \leq \frac{400(D+d)^2 d}{D^3} \times \frac{\gamma_d}{\gamma_D} \times 1.5 \quad \text{[Equation 1]}$$

In Equation 1, D is a particle diameter (μm) of the first particle, $\gamma_D$ is a bulk density (g/mL) of the first particle, d is a particle diameter (μm) of the second particle, and γd is a bulk density (g/mL) of the second particle.

If the second particles are added in an amount within the range defined by the above Equation 1, the mono-layered coating of the second particles may be formed without deteriorating the high-capacity properties of the first particles while enhancing the rate properties and mechanical/chemical stability.

In Equation 1, a weight factor expressed by Equation 1-1 below may be used, and the second particles may be added in a predetermined range around the weight factor. Accordingly, a reduction of the capacity properties from the first particles due to an excessive increase of a coating amount may be prevented while implementing a substantial coating effect of the second particles.

$$\text{Weight factor} = \frac{400(D+d)^2 d}{D_3} \times \frac{\gamma_d}{\gamma_D} \quad \text{[Equation 1-1]}$$

In a preferable embodiment, the weight of the second particle (A) based on 100 weight parts of the total weight of the first particle and the second particle may satisfy Equation 2 below.

$$\frac{400(D+d)^2 d}{D^3} \times \frac{\gamma_d}{\gamma_D} \times 0.75 \leq A \leq \frac{400(D+d)^2 d}{D^3} \times \frac{\gamma_d}{\gamma_D} \times 1.25 \quad \text{[Equation 2]}$$

In some embodiments, the particle diameter of the second particle (e.g., D50 of a volumetric cumulative distribution of particle size) may be 1/10 or less of the particle diameter of the first particle. Within the above range, the second particles may be directly and stably attached to the surface of the first particle while facilitating the formation of the substantially mono-layered coating as shown in FIG. 3.

Preferably, the particle diameter of the second particle may be in a range from 1/1,000 to 1/10 of the particle diameter of the first particle.

For example, the first particle may have a particle diameter from 1 μm to 100 μm, and the second particle may have a particle diameter from 10 nm to 1,000 nm. Preferably, the particle diameter of the first particle may be from 5 μm to 50 μm, and the particle diameter of the second particle may be from 40 nm to 500 nm.

In example embodiments, the bulk density of the second particles may be less than or equal to the bulk density of the first particles. Preferably, the bulk density of the second particles may be smaller than the bulk density of the first particles.

For example, the bulk density of the first particles may be from about 0.5 g/mL to 3 g/mL, and the bulk density of the second particles may be from about 0.01 g/mL to 1 g/mL.

The bulk density (apparent density) may refer to a density measured based on a volume including voids between particles when the particles are filled in a specific container.

The bulk density may be measured using a bulk density measuring device (e.g., EV-02; manufacturer: elecerolab). For example, the active material particles may be slowly put in an empty container of a specific volume (for example, 25 ml) through a funnel until the particles slowly overflow, and then the overflowing active material particles may be removed with a flat object (a ruler, a knife, etc.) to prevent the particles from being pressed or shaken. Thereafter, weights of the active material particles and the container are measured, and then the bulk density may be obtained by the following Relational Equation.

Bulk density=[(active material particle weight+container weight)−(container weight)]/25 ml [Relational Equation]

Within the ranges of the particle diameter and bulk density of the first and second particles described above, the anode active material may more easily provide high-capacity and high-rate properties from the substantially mono-layered coating formation by the second particles.

In exemplary embodiments, the second particles may cover at least about 50%, 70%, 75%, or 80% or more of the surface of the first particle. Preferably, the second particles may cover at least about 85%, 90%, or 95% or more of the surface of the first particle.

In exemplary embodiments, the first particles and the second particles satisfying the above-described particle diameter, bulk density and weight ratio may be prepared.

The first particles and the second particles may be dry-mixed. During the dry mixing, stress and heat may be generated by a friction between the first particles and the second particles, and the second particles may be attached to the surface of each of the first particles. The attachment may be created by a van der Waals bonding or a shear stress due to mechanical energy.

In exemplary embodiments, the dry mixing may be performed at a linear velocity of 650 cm/s to 2,700 cm/s. If the linear velocity is less than 650 cm/s, the shear stress may not be sufficiently generated so that the second particles may not be firmly attached to the first particles. If when the linear velocity exceeds 2,700 cm/s, the first particles may be excessively abraded, and an electrical performance of the anode active material may be deteriorated.

Preferably, the linear velocity of the dry mixing may be from 900 cm/s to 2,000 cm/s.

The dry mixing may be performed by, e.g., a ball mill, a Nobilta mill, a mechanofusion, a high speed mill, or the like.

In the anode active material prepared according to the above-described embodiment, the second particles may be firmly attached to the surface of the first particle. Thus, even when the anode active material is mixed with a binder, a conductive material, etc. to form a slurry, the second particles may remain strongly attached to the first particle. Accordingly, enhanced electrical properties of the anode active material and the secondary battery may be achieved.

In exemplary embodiments, an amount of the anode active material may be from 80 wt % to 99 wt % based on a total weight of the anode active material layer 120. Preferably, the anode active material may be included in an amount of 90 wt % to 98 wt % based on the total weight of the anode active material layer 120.

For example, an anode slurry may be prepared by mixing and stirring the anode active material with a binder, a conductive material and/or a dispersive agent in a solvent. The anode slurry may be applied (coated) on the anode current collector 125, and dried and pressed to form the anode active material layer 120.

Materials substantially the same as or similar to those used for forming the cathode 100 may be used as the binder and the conductive material. In some embodiments, the binder for forming the anode 130 may include, e.g., styrene-butadiene rubber (SBR) or an acrylic binder for compatibility with the carbon-based active material, and may be used with a thickener such as carboxymethyl cellulose (CMC).

In exemplary embodiments, an density of the anode active material layer 120 may be 1.4 to 1.9 g/cc.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, the anode active material layer 120 may have a multi-layered structure.

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

The separation layer 140 may extend between the cathode 100 and the anode 130, and may be folded and wound along a thickness direction of the lithium secondary battery.

Accordingly, a plurality of the anodes 100 and the cathodes 130 may be stacked in the thickness direction using the separation layer 140.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding the separation layer 140.

The electrode assembly 150 may be accommodated together with an electrolyte in a case 160 to define a lithium secondary battery. The case 160 may include, e.g., a pouch, a can, etc.

In exemplary embodiments, a non-aqueous electrolyte may be used as the electrolyte.

For example, the non-aqueous electrolyte may include a lithium salt and an organic solvent. The lithium salt may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode electrode current collector 125 included in each electrode cell to one side of the case 160. The electrode tabs may be welded together with the one side of the case 160 to form an electrode lead (a cathode lead 107 and an anode 127) extending or exposed to an outside of the case 160.

In FIG. 1, the cathode lead 107 and the anode lead 127 are illustrated to protrude from the same side of the case 160 in a planar view, but may be formed at opposite sides of the case 160.

For example, the electrode lead 107 may be formed at the one side of the case 160, and the anode lead 127 may be formed at the other side of the case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Fabrication of Anode

Artificial graphite particles (D50:10 μm) coated with amorphous carbon as the first particles and Super P-Li particles (D50:0.045 μm) as second particles were input in a mechanofusion device in a weight ratio of 99.5%:0.5% (the weight factor of Equation 1-1: about 0.52). Thereafter, an anode active material was prepared by dry coating for 10 minutes at a linear velocity of 1500 cm/s.

A slurry was prepared by mixing the anode active material and a binder in a weight ratio of 97.3:2.7. The slurry was coated on a Cu-foil so that a loading level was 7 to 8 mg/cm² and pressed to 1.6 g/cc to form an anode.

Bulk densities measured using EV-02 (manufacturer: elecerolab) of the first particle and the second particle were 0.7 g/mL and 0.2 g/mL, respectively.

Particle diameters of the first particles and the second particles were measured using a particle size measuring device (maker: malvern, model name: mastersizer 3000). Specifically, 800 ml of a solvent (ethanol) and a sample of the first particles and the second particles were added to a container of the measuring device. A stirring speed was 2,500 rpm and an ultrasonic intensity was set to 20, and then the particle diameters of the first particles and the second particles were measured as D50 values displayed from the measuring device.

(2) Fabrication of Cathode $LiNi_{0.8}Co_{0.1}Mn_{0.1}O_2$ as a cathode active material, carbon black as a conductive material, and polyvinylidene fluoride (PVDF) as a binder were mixed in a mass ratio of 92:5:3 to prepare a cathode slurry. The cathode slurry was coated on an aluminum substrate, and dried and pressed to form a cathode.

(3) Fabrication of Secondary Battery

The cathode and the anode prepared above were disposed with a polyethylene (PE) separator (13 μm) interposed therebetween to form an electrode cell, and the electrode cells were stacked to form an electrode assembly. The electrode assembly 150 was accommodated in a pouch and electrode tab portions were fused. Thereafter, an electrolyte was injected and sealed to prepare a secondary battery.

After preparing a 1M $LiPF_6$ solution with a mixed solvent of ethylene carbonate/ethylmethyl carbonate/diethyl carbonate (EC/EMC/DEC, 25/45/30; volume ratio), 1 wt % of vinylene carbonate (VC), 0.5 wt % of 1,3-propensultone (PRS) and 0.5 wt % of lithium bis(oxalato)borate (LiBOB) were added to form the electrolyte.

Example 2

A secondary battery was manufactured by the same method as that in Example 1, except that a weight ratio of the second particle was 0.65 wt %.

Example 3

A secondary battery was manufactured by the same method as that in Example 1, except that except that a weight ratio of the second particle was 0.4 wt %.

Comparative Example 1

A secondary battery was manufactured by the same method as that in Example 1 except that a weight ratio of the second particle was 1 wt %.

Comparative Example 2

A secondary battery was manufactured by the same method as that in Example 1 except that a weight ratio of the second particle was 0.1 wt %.

Comparative Example 3

A secondary battery was manufactured by the same method as that in Example 1, except that the second particle was not used.

Comparative Example 4

A secondary battery was manufactured by the same method as that in Example 1, except that the coating process performed under the condition of 10 minutes at a linear speed of 1500 cm/s was not performed.

Experimental Example (1) SEM (Scanning Electron Microscopy) Imaging

Figure 4:
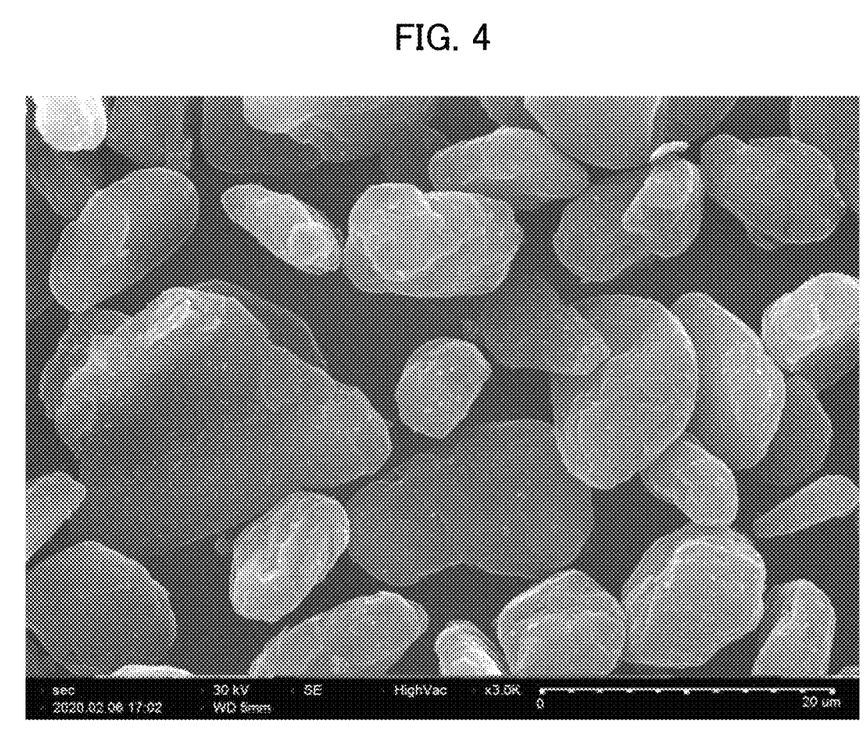
FIG. 4 is a scanning electron microscopy (SEM) image of an anode active material for a secondary battery according to Example 1.
Figure 5:
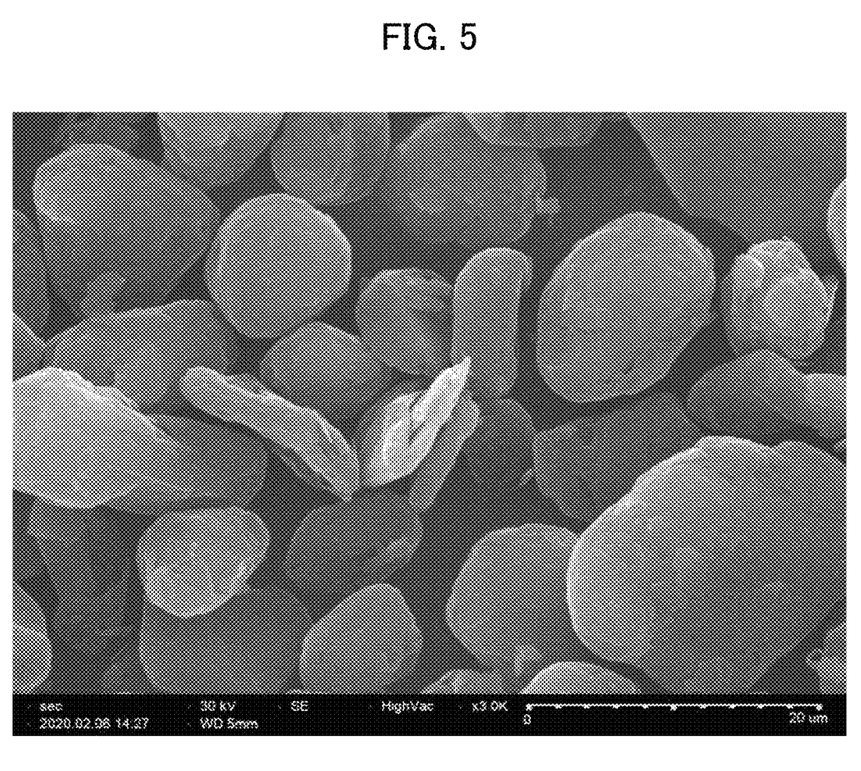
FIGS. 5 and 6 are SEM images of anode active materials for a secondary battery according to Comparative Examples 3 and 4.
Figure 6:
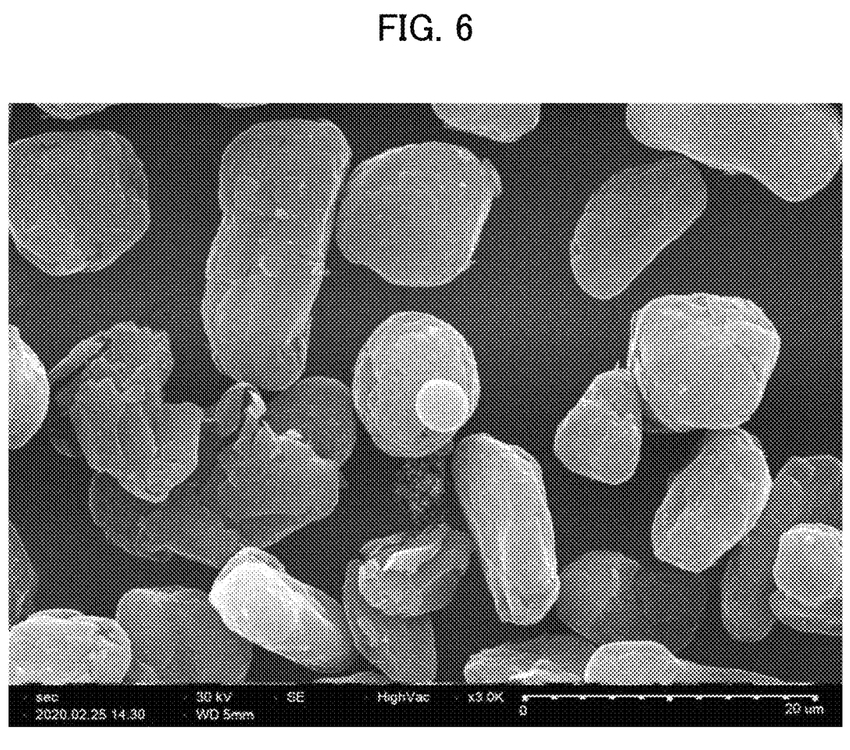

Images of the anode active materials of Examples and Comparative Examples were obtained by a scanning electron microscopy (SEM) as shown in FIGS. 4 to 6.

FIG. 4 is an SEM image of an anode active material for a secondary battery according to Example 1.

FIGS. 5 and 6 are SEM images of anode active materials for a secondary battery according to Comparative Examples 3 and 4.

Referring to FIGS. 4 to 6, in the anode active material of Example, it was confirmed that the fine carbon particles were substantially uniformly attached to the graphite particle. In the anode active material of Comparative Examples, the fine carbon particles were agglomerated with each other to form a needle-like or angular agglomerated particles.

(2) Evaluation of Capacity Retention

The secondary batteries of the above Examples and Comparative Examples were repeatedly charged and discharged under high-rate conditions in the order of 0.1C, 0.2C, 0.5C, 1.0C, 1.5C, 2.0C, 3.0C, 4.0C and 5.0C (total 45 cycles), and a discharge capacity of each cycle was measured. Thereafter, while repeating charging and discharging at a low rate of 0.1C, a ratio of a discharge capacity measured at the 60th cycle relative to a discharge capacity measured at the first cycle was calculated as a percentage (%).

The evaluation results are shown in Table 1 below.

TABLE 1

|  | Capacity Retention (%) |
|---|---|
| Example 1 | 96% |
| Example 2 | 93% |
| Example 3 | 94% |
| Comparative Example 1 | 46% |
| Comparative Example 2 | 37.5% |
| Comparative Example 3 | 28% |
| Comparative Example 4 | 36% |

As shown in Table 1, in Examples where the weight of the second particles was adjusted according to Equation 1 as described above, a mono-layered coating effect by the second particles was implemented and an improved capacity retention rate was obtained.

In the case of Comparative Example 4, a dry rotation was not performed, and thus the coating effect of the second particles was not substantially implemented.

What is claimed is:

1. An anode active material for secondary battery, comprising:
   first particles serving as a core active material; and
   second particles attached on surfaces of the first particles,
   wherein a bulk density of the second particles is smaller than a bulk density of the first particles, and
   the bulk density of the first particles is from 0.5 g/mL to 3 g/mL, and the bulk density of the second particles is from 0.01 g/mL to 1 g/mL,
   wherein a weight of the second particles based on 100 weight parts of a total weight of the first particles and the second particles satisfies Equation 1 below:

$$\frac{400(D+d)^2 d}{D^3} \times \frac{\gamma_d}{\gamma_D} \times 0.5 \leq A \leq \frac{400(D+d)^2 d}{D^3} \times \frac{\gamma_d}{\gamma_D} \times 1.5 \quad \text{[Equation 1]}$$

wherein, in Equation 1, A is a weight part of the second particles, D is a particle diameter (μm) of the first particles, $\gamma_D$ is the bulk density (g/mL) of the first particles, d is a particle diameter (μm) of the second particles, and γd is the bulk density (g/mL) of the second particles.

2. The anode active material for a lithium secondary battery according to claim 1, wherein the weight of the second particles based on 100 weight parts of the total weight of the first particles and the second particles satisfies Equation 2 below:

$$\frac{400(D+d)^2 d}{D^3} \times \frac{\gamma_d}{\gamma_D} \times 0.75 \leq A \leq \frac{400(D+d)^2 d}{D^3} \times \frac{\gamma_d}{\gamma_D} \times 1.25. \quad \text{[Equation 2]}$$

3. The anode active material for a secondary battery according to claim 1, wherein a ratio of the particle diameter of the second particles relative to the particle diameter of the first particles is 0.1 or less.

4. The anode active material for a secondary battery according to claim 1, wherein a ratio of the particle diameter of the second particles relative to the particle diameter of the first particles is in a range from 0.001 to 0.1.

5. A secondary battery, comprising:
   an anode comprising the anode active material for a secondary battery according to claim 1; and
   a cathode facing the anode and being physically separated from the anode.

6. The anode active material for a secondary battery according to claim 1, wherein the second particles form a mono-layered coating on a surface of each of the first particles.

7. The anode active material for a secondary battery according to claim 1, wherein the first particles comprise at least one of a carbon-based active material or a silicon-based active material.

8. The anode active material for a secondary battery according to claim 1, wherein the second particles comprise at least one of a carbon-based material, a silicon-based material, a metal-based material or an oxide-based material.

9. The anode active material for a secondary battery according to claim 8, wherein the carbon-based material comprises at least one selected from the group consisting of carbon nanotube, carbon fiber and carbon black.

10. The anode active material for a secondary battery according to claim 8, wherein the oxide-based material comprises at least one selected from the group consisting of lithium titanate (LTO), $TiO_2$, $ZrO_2$, $ZnO_2$, $AlO_2$, $Fe_2O_3$, $Li_2O$, and MgO.

11. A method of preparing an anode active material for a secondary battery, comprising:

preparing first particles as a core active material and second particles as a coating particle; and mixing the first particles and the second particles by a dry rotation to attach the second particles on surfaces of the first particles;

wherein a bulk density of the second particles is smaller than a bulk density of the first particles, and the bulk density of the first particles is from 0.5 g/mL to 3 g/mL, and the bulk density of the second particles is from 0.01 g/mL to 1 g/mL, wherein a weight of the second particles based on 100 weight parts of a total weight of the first particles and the second particles satisfies Equation 1 below:

$$\frac{400(D+d)^2 d}{D^3} \times \frac{\gamma_d}{\gamma_D} \times 0.5 \leq A \leq \frac{400(D+d)^2 d}{D^3} \times \frac{\gamma_d}{\gamma_D} \times 1.5 \quad \text{[Equation 1]}$$

wherein, in Equation 1, A is a weight part of the second particles, D is a particle diameter (μm) of the first particles, $\gamma_D$ is the bulk density (g/mL) of the first particles, d is a particle diameter (μm) of the second particles, and $\gamma_d$ is the bulk density (g/mL) of the second particles.

12. The method of claim 11, wherein the dry rotation is performed at a linear velocity from 650 cm/s to 2,700 cm/s.

\* \* \* \* \*

UNITED STATES PATENT AND TRADEMARK OFFICE
CERTIFICATE OF CORRECTION

PATENT NO. : 12,206,096 B2
APPLICATION NO. : 17/552576
DATED : January 21, 2025
INVENTOR(S) : Mi Ryeong Lee et al.

Page 1 of 1

It is certified that error appears in the above-identified patent and that said Letters Patent is hereby corrected as shown below:

In the Claims

Column 12, Line 60, Claim 9, delete "carbon fiber" and insert -- carbon fiber, --

Column 13, Line 21, Claim 11, delete "γD" and insert -- $\gamma_D$ --

Signed and Sealed this
Twenty-fifth Day of March, 2025

Coke Morgan Stewart
*Acting Director of the United States Patent and Trademark Office*